(12) United States Patent
Murschall et al.

(10) Patent No.: US 6,730,406 B2
(45) Date of Patent: *May 4, 2004

(54) MATT, UV STABLE, FLAME-RETARDANT CO-EXTRUDED POLYESTER FILM, A METHOD FOR THE PRODUCTION THEREOF AND THE USE OF THE SAME

(75) Inventors: Ursula Murschall, Nierstein (DE); Ulrich Kern, Ingelheim (DE); Guenther Crass, Taunusstein (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/181,509

(22) PCT Filed: Jan. 10, 2001

(86) PCT No.: PCT/EP01/00211

§ 371 (c)(1),
(2), (4) Date: Jul. 18, 2002

(87) PCT Pub. No.: WO01/53089

PCT Pub. Date: Jul. 26, 2001

(65) Prior Publication Data

US 2003/0108754 A1 Jun. 12, 2003

(30) Foreign Application Priority Data

Jan. 20, 2000 (DE) .......................... 100 02 160

(51) Int. Cl.[7] .................. B32B 27/08; B32B 27/18; B32B 27/36; B32B 31/30
(52) U.S. Cl. .................. 428/423.7; 428/213; 428/215; 428/216; 428/336; 428/430; 428/446; 428/458; 428/480; 428/483; 428/910; 525/437; 525/444; 264/288.4; 264/290.2; 264/173.12; 264/173.15; 106/15.05; 106/18.14; 106/18.18; 106/18.31
(58) Field of Search .................. 428/215, 212, 428/213, 216, 336, 423.7, 430, 446, 458, 480, 483, 910; 525/437, 444; 264/288.4, 290.2, 173.12, 173.15; 106/15.05, 18.14, 18.18, 18.31

(56) References Cited

U.S. PATENT DOCUMENTS

| | | | |
|---|---|---|---|
| 3,322,716 A | * 5/1967 | Klein et al. .................. 524/135 |
| 3,563,942 A | 2/1971 | Heiberger | |
| 3,779,993 A | 12/1973 | Kibler et al. | |
| 4,102,853 A | * 7/1978 | Kawamura et al. .......... 524/425 |
| 4,252,885 A | 2/1981 | McGrail et al. | |
| 4,399,179 A | 8/1983 | Minami et al. | |
| 5,073,435 A | 12/1991 | Eyraud et al. | |
| 5,173,357 A | * 12/1992 | Nakane et al. ............... 428/220 |
| 5,248,713 A | * 9/1993 | Lunk et al. .................. 524/120 |
| 5,521,236 A | * 5/1996 | Moy et al. .................... 524/101 |
| 5,674,947 A | * 10/1997 | Oishi et al. .................. 525/289 |
| 5,972,445 A | * 10/1999 | Kimura et al. .............. 428/35.4 |
| 6,270,888 B1 | * 8/2001 | Rutter et al. ................. 428/347 |
| 6,358,604 B1 | * 3/2002 | Peiffer et al. ................ 428/336 |
| 2002/0068158 A1 | * 6/2002 | Peiffer et al. ................ 428/220 |
| 2002/0068159 A1 | * 6/2002 | Peiffer et al. ................ 428/220 |
| 2002/0071945 A1 | * 6/2002 | Peiffer et al. ................ 428/220 |
| 2002/0114944 A1 | * 8/2002 | Peiffer et al. ................ 428/336 |
| 2003/0087105 A1 | * 5/2003 | Murschall et al. ........ 428/423.7 |

FOREIGN PATENT DOCUMENTS

| | | |
|---|---|---|
| DE | 23 46 787 A1 | 3/1975 |
| EP | 0 144 878 A2 | 6/1985 |
| EP | 0 144 978 A2 | 6/1985 |
| EP | 0 245 207 A2 | 11/1987 |
| EP | 0 296 620 A2 | 12/1988 |
| EP | 0 587 148 A2 | 3/1994 |
| EP | 0 602 964 A1 | 6/1994 |
| EP | 0 620 245 A1 | 10/1994 |
| EP | 0 826 478 A2 | 3/1998 |
| EP | 0 976 548 A2 | 2/2000 |
| GB | 2 344 596 A * | 6/2000 |
| WO | WO 94/13476 A1 | 6/1994 |
| WO | WO 94/13481 A1 | 6/1994 |
| WO | WO 98/06575 * | 2/1998 |

OTHER PUBLICATIONS

Schimtz, Peter et al., "Films." Ullmann's Encyclopedia of Industrial Chemistry, 5th Ed., vol. A11 (1988), pp. 85–95, 108–110.*

H. Day, D. M. Wiles Journal Applied Polymer Science vol. 16, p. 203, 1972.

* cited by examiner

Primary Examiner—Vivian Chen
(74) Attorney, Agent, or Firm—ProPat, L.L.C.

(57) ABSTRACT

The invention relates to a co-extruded, biaxially oriented polyester film consisting of a base layer and at least one outer layer. The film contains at least one flame-retardant agent, at least one UV-stabilizer and has a matt outer layer which contains a mixture and/or a blend of two components (I) and (II), whereby component (I) is substantially a polyethylene terephthalate homopolymer, or a polyethylene terephthalate copolymer, or a mixture of polyethylene terephthalate homopolymers or polyethylene terephthalate copolymers, and component (II) is a polymer containing at least one sulphonate group.

25 Claims, No Drawings

MATT, UV STABLE, FLAME-RETARDANT CO-EXTRUDED POLYESTER FILM, A METHOD FOR THE PRODUCTION THEREOF AND THE USE OF THE SAME

The invention relates to a biaxially oriented polyester film with a base layer composed of at least 70% by weight of a thermoplastic polyester and comprising at least one UV stabilizer and one flame retardant, and with at least one matt outer layer which comprises a mixture or, respectively, a blend made from two components I and II. The invention further relates to the use of the film and to a process for its production.

Component I of the mixture or blend is a polyethylene terephthalate homopolymer or polyethylene terephthalate copolymer, or a mixture of polyethylene terephthalate homo- or copolymers.

Component II of the mixture or blend is a polyethylene terephthalate copolymer which is composed of the condensation product of the following monomers or, respectively, of their derivatives capable of forming polyesters: isophthalic acid, aliphatic dicarboxylic acid, sulfomonomer which contains a metal sulfonate group on the aromatic moiety of an aromatic dicarboxylic acid, and aliphatic or cycloaliphatic glycol.

The outer layer of the invention has a characteristic matt surface or appearance and is very suitable for use in constructing exhibition stands, in greenhouses, or for industrial applications, in particular where a requirement is UV resistance or impermeability to UV light and flame retardancy to DIN 4102 Part 2, construction materials class B2 and B1.

BACKGROUND OF THE INVENTION

There is high industrial demand for transparent, high-gloss plastic films, e.g. biaxially oriented propylene films or biaxially oriented polyester films. There is also an increasing demand for transparent films of this type which are flame retardant to DIN 4102 and which have at least one surface layer which is not high-gloss but has a characteristic matt appearance and therefore, for example, provides the application with an appearance which is particularly attractive and therefore effective for promotional purposes, and provides protection from UV radiation while also providing flame retardancy.

U.S. Pat. No. 4,399,179 describes a coextruded biaxially oriented polyester film which is composed of a transparent base layer and of at least one matt layer which essentially consists of a certain polyethylene terephthalate copolymer and also comprises inert particles with a diameter of from 0.3 to 20 μm at a concentration of from 3 to 40%. The specific copolymer is a processing aid which reduces the viscosity of the melt comprising the inert particles, thus permitting satisfactory extrusion of that layer. The mattness of the film is achieved by adding the inert particles to the appropriate layer.

EP 0 144 978 describes a self-supporting oriented film made from thermoplastic and, on at least one of its two surfaces, bearing a continuous polyester coating which is applied as aqueous dispersion to the film prior to the final stretching step. The polyester coating is composed of a condensation product of various monomers which are capable of forming polyesters, such as isophthalic acid, aliphatic dicarboxylic acid, sulfomonomers, and aliphatic or cycloaliphatic glycols.

EP-A-0 620 245 describes films with improved heat resistance. These films comprise antioxidants which are suitable for scavenging free radicals formed in the film and degrading any peroxide formed. However, that specification gives no proposal as to how the UV resistance of films of that type might be improved.

DE-A 2346 787 describes a flame-retardant, phospholane-modified polymer. Besides the polymer, the use of the polymer to give films and fibers is also claimed. When films were produced from this phospholane-modified polymer the following shortcomings were apparent:

The polymer is very susceptible to hydrolysis and has to be very effectively predried. When the polymer is dried with prior art dryers it cakes, and production of a film is therefore possible only under very difficult conditions.

The films produced, under extreme and uneconomic conditions, also embrittle at high temperatures. The associated decline in mechanical properties is so severe as to make the film unusable. This embrittlement occurs after as little as 48 hours of exposure to heat.

The instances described give no indication as to how at least one surface of the film can be provided with low gloss while retaining high film transparency, or how the film is to absorb UV light, or how the film is to be provided with high UV resistance and also flame retardancy.

It was therefore an object of the present invention to provide a coextruded biaxially oriented and transparent polyester film which has at least one matt outer layer and whose production is simple and cost-effective, and which has the good physical properties of known films, causes no disposal problems, and in particular absorbs UV light and has high UV resistance, and also is flame-retardant to DIN 4102, and does not embrittle on exposure to heat.

BRIEF DESCRIPTIONS OF THE INVENTION

This object is achieved by means of a coextruded and biaxially oriented polyester film of the generic type mentioned at the outset, the characterizing features of which are that the film comprises at least one UV stabilizer and at least one flame retardant, the flame retardant and, where appropriate, the UV stabilizer being fed by way of masterbatch technology, and has a matt outer layer which comprises a mixture or, respectively, a blend made from two components I and II.

DETAILED DESCRIPTION OF THE INVENTION

Component I of the mixture or blend is a polyethylene terephthalate homopolymer or polyethylene terephthalate copolymer, or a mixture made from polyethylene terephthalate homo- or copolymers.

Component II of the copolymer or of the mixture or blend is a polymer containing at least one sulfonate group, in particular a condensation product of the following monomers or of their derivatives capable of forming polyesters:

A) from 65 to 95 mol % of isophthalic acid;
B) from 0 to 30 mol % of at least one aliphatic dicarboxylic acid with the formula $$HOOC(CH_2)_nCOOH$$

where
n is from 1 to 11;

C) from 5 to 15 mol % of at least one sulfomonomer containing an alkali metal sulfonate group on the aromatic moiety of a dicarboxylic acid;

D) a copolymerizable aliphatic or cycloaliphatic glycol having from 2 to 11 carbon atoms, in the stoichiometric amount necessary to form 100 mol % of condensate;

where each of the percentages given is based on the total amount of the monomers forming component II.

High UV resistance means that sunlight or other UV radiation causes no, or only extremely little, damage to the films, and that the films are therefore suitable for outdoor applications and/or critical indoor applications. In particular, the films should not yellow after a number of years of outdoor use, nor display any embrittlement or cracking of the surface, nor should their mechanical properties deteriorate. High UV resistance therefore means that the film absorbs UV light and does not transmit light until the visible region has been reached.

The good mechanical properties include high modulus of elasticity ($E_{MD}$>3200 N/mm$^2$; $E_{TD}$>3500 N/mm$^2$) and also good values for tensile strength at break (in MD>100 N/mm$^2$; in TD>130 N/mm$^2$).

Good orientability includes the capability of the film to give excellent orientation both longitudinally and transversely during its production, without break-offs.

Cost-effective production includes the capability of the raw materials or raw material components needed for producing the flame-retardant film to be dried using conventional industrial dryers. It is important that the raw materials do not cake or undergo thermal degradation. These prior art industrial dryers include vacuum dryers, fluidized-bed dryers, and fixed-bed dryers (tower dryers). These dryers operate at temperatures from 100 to 170° C., at which polymers provided with flame retardancy by conventional methods cake and eventually have to be removed by force, making film production impossible. In the case of the vacuum dryer, which has the gentlest drying action, the raw material usually passes through a range of temperatures from about 30 to 130° C. at a subatmospheric pressure of 50 mbar. This has to be followed by what is known as post-drying in a hopper at temperatures from 100 to 130° C. with a residence time of from 3 to 6 hours. Even here, the known polymers cake to an extreme extent.

No embrittlement on short exposure to heat means that after 100 hours of controlled heating at 100° C. in a circulating-air drying cabinet the film has not embrittled and does not have poor mechanical properties.

For the purposes of the present invention, mixtures are mechanical mixtures prepared from the individual components. For this, the individual constituents are generally combined in the form of small-dimensioned compressed moldings, e.g. lenticular or bead-shaped pellets, and mixed with one another mechanically, using a suitable agitator. Another way of producing the mixture is to feed components I and II in pellet form separately to the extruder for the outer layer of the invention, and to carry out the mixing in the extruder and/or in the downstream systems for transporting the melt.

For the purposes of the present invention, a blend is an alloy-like composite of the individual components I and II which can no longer be separated into the initial constituents. A blend has properties like those of a homogeneous material and can therefore be characterized by appropriate parameters.

According to the invention, the film has at least two layers. The layers which it then encompasses are a layer B (=base layer) and the outer layer A of the invention. In one preferred embodiment of the invention, the film has a three-layer structure, and has the outer layer A on one side of the layer B (=base layer) and has another layer C on the other side of the layer B. In this case, the two layers A and C form the outer layers A and C. According to the invention, the UV stabilizer and the flame retardant may be present in the outer layer(s) and/or in the base layer.

The base layer B of the film is preferably composed of at least 70% by weight of a thermoplastic polyester. Polyesters suitable for this purpose are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT), or else made from ethylene glycol, naphthalene-2,6-dicarboxylic acid and biphenyl-4,4'-dicarboxylic acid (=polyethylene 2,6-naphthalate dibenzoate, PENBB). Particular preference is given to polyesters at least 90 mol %, preferably at least 95 mol %, of which is composed of ethylene glycol units and terephthalic acid units, or of ethylene glycol units and naphthalene-2,6-dicarboxylic acid units. The remaining monomer units derive from those other aliphatic, cycloaliphatic or aromatic diols and dicarboxylic acids. Other examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the $C_3$–$C_{19}$ g alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

At least one outer layer of the multilayer film of the invention comprises a mixture or, respectively, a blend made from two components I and II and described in more detail below, and, where appropriate, comprises additives.

Component I of the outer layer mixture or of the blend essentially consists of a thermoplastic polyester, in particular the polyester described in more detail for the base layer. A method which has proven successful here for achieving a high degree of mattness is to use a polyester of comparatively low viscosity for component I of the outer layer of the invention. To describe the viscosities of the melts use is made of a modified solution viscosity (SV or "standard viscosity"). The SVs of commercially available polyethylene terephthalates suitable for producing biaxially oriented films are in the range from 500 to 1200. A method which has proven successful for obtaining a high degree of film mattness for the purposes of the present invention is to use polymers whose SV is in the range from 500 to 800, preferably in the range from 500 to 750, particularly preferably in the range from 500 to 700, for component I of the outer layer of the invention.

As stated above, component II of the outer layer mixture is obtained by condensation of the following monomers or of their derivatives capable of forming polymers:

A) isophthalic acid,
B) if appropriate, an aliphatic dicarboxylic acid of the formula

HOOC(CH$_2$)$_n$COOH where
n is in the range from 1 to 11,

C) a sulfomonomer containing an alkali metal sulfonate group on the aromatic moiety of an aromatic dicarboxylic acid, and
D) an aliphatic or cycloaliphatic glycol having from 2 to 11 carbon atoms, in the amount needed to form 100 mol % of condensate.

The total molar equivalents of acid present should be substantially the same as the total equivalents of glycol present.

Examples of dicarboxylic acids suitable as component B) of the copolyesters are malonic, adipic, azelaic, glutaric, sebacic, suberic, succinic and brassylic acid, and also mixtures of these acids or their derivatives capable of forming polyesters. Of the abovementioned acids, sebacic acid is preferred.

Examples of sulfomonomers which contain a metal sulfonate group on the aromatic moiety of an aromatic dicarboxylic acid (component C) are monomers of the following formula:

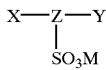

where
M is a monovalent cation of an alkali metal,
Z is a trivalent aromatic radical, and
X and Y are carboxy groups or polyester-forming equivalents.

Monomers of this type are described in U.S. Pat. Nos. 3,563,942 and 3,779,993. Examples of monomers of this type are the sodium salts of sulfoterephthalic acid, of 5-sulfoisophthalic acid, of sulfophthalic acid, of 5-(p-sulfophenoxy)isophthalic acid, or of 5-sulfopropoxyisophthalic acid, and similar monomers, and also derivatives of these, such as the dimethyl esters, capable of forming polyesters. M is preferably Na$^+$, Li$^+$, or K$^+$.

The term "derivatives capable of forming polyesters" here means reaction participants with groups capable of condensation reactions, in particular transesterification reactions, to form polyester bonds. Groups of this type include carboxy groups. They also include the lower alkyl esters of these, e.g. dimethyl terephthalate, diethyl terephthalate, and numerous other esters, halides, and salts. The acid monomers are preferably used in the form of dimethyl esters, since this permits better control of the condensation reaction.

Examples of glycols suitable as component D) are ethylene glycol, 1,5-pentanediol, 1,6-hexanediol, neopentyl glycol, 1,10-decanediol, cyclohexanedimethanol, and similar substances. It is preferable to use ethylene glycol.

The copolyesters may be prepared by known polymerization techniques. The procedure is generally to combine the acid components with glycol and to heat these in the presence of an esterification catalyst, with subsequent addition of a polycondensation catalyst.

The quantitative ratios of components A, B, C, and D used to prepare the mixtures of the invention have been found to be decisive for obtaining the matt outer layer. For example, at least about 65 mol % of isophthalic acid (component A) has to be present as acid component. Component A is preferably from about 70 to 95 mol % of pure isophthalic acid.

As far as component B is concerned, any acid with the formula mentioned gives satisfactory results, and preference is given to adipic acid, azelaic acid, sebacic acid, malonic acid, succinic acid, glutaric acid, and mixtures of these acids. The desired amount within the range given is preferably from 1 to 20 mol %, based on the acid components of the mixture II, if component B is present in the composition.

The amount of the glycol component present is stoichiometric.

The copolyesters suitable for the purposes of the invention also have an acid value below 10, preferably from 0 to 3, an average molecular weight below about 50,000, and an SV in the range from about 30 to 700, preferably from about 350 to 650.

The ratio (ratio by weight) of the two components I and II of the outer layer mixture or blend may vary within wide limits and depends on the intended use of the multilayer film. The ratio of components I and II is preferably in the range from I:II=10:90 to I:II=95:5, preferably from I:II= 20:80 to I:II=95:5, and in particular from I:II=30:70 to I:II=95:5.

According to the invention, the film comprises a UV stabilizer and a flame retardant. The UV stabilizer is advantageously fed by way of what is known as masterbatch technology directly during film production, the concentration of the UV stabilizer here preferably being from 0.01 to 5% by weight, based on the weight of the layer of the crystallizable thermoplastic.

According to the invention, the flame retardant is likewise fed by way of what is known as masterbatch technology directly during film production, the concentration here being from 0.5 to 30% by weight, preferably from 1 to 20% by weight, based on the weight of the layer of the crystallizable thermoplastic.

Light, in particular the ultraviolet content of solar radiation, i.e. the wavelength region from 280 to 400 nm, causes degradation in thermoplastics, the results of which are not only a change in appearance due to color change or yellowing but also an adverse effect on mechanical and physical properties.

The suppression of this photooxidative degradation is of considerable industrial and economic importance, since without it many thermoplastics have drastically reduced scope of application.

The absorption of UV light by polyethylene terephthalates, for example, starts below 360 nm, increasing markedly below 320 nm, and is very pronounced below 300 nm. Maximum absorption occurs at between 280 and 300 nm.

In the presence of oxygen it is mainly chain cleavage which is observed, but without any crosslinking. The predominant photooxidation products in quantity terms are carbon monoxide, carbon dioxide and carboxylic acids. Besides direct photolysis of the ester groups, attention has to be paid to oxidation reactions which proceed via peroxide radicals, again to form carbon dioxide.

In photooxidation of polyethylene terephthalates there can also be cleavage of hydrogen at the position a to the ester groups, giving hydroperoxides and decomposition products of these, and this may be accompanied by chain cleavage (H. Day, D. M. Wiles, *J. Appl. Polym. Sci.* 16 [1972] p. 203).

UV stabilizers, i.e. light stabilizers which are UV absorbers, are chemical compounds which can intervene in the physical and chemical processes of light-induced degradation. Carbon black and other pigments can give some protection from light, but these substances are unsuitable for transparent films, since they cause discoloration or color change. For transparent, matt films the only suitable compounds are organic or organometallic compounds which give rise to no, or only extremely slight, color or color change in the thermoplastic to be stabilized, i.e. are soluble in the thermoplastic.

UV stabilizers which are suitable light stabilizers are those which absorb at least 70%, preferably 80%, particularly preferably 90%, of the UV light in the wavelength region from 180 to 380 nm, preferably from 280 to 350 nm. These are particularly suitable if they are thermally stable, i.e. do not decompose, nor cause any evolution of gas, in the temperature range from 260 to 300° C. Examples of UV stabilizers which are suitable light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines and triazines, preference being given to the 2-hydroxybenzotriazoles and the triazines.

The film of the invention comprises at least one flame retardant, fed by way of what is known as masterbatch technology directly during film production, the concentration of the flame retardant being in the range from 0.5 to 30.0% by weight, preferably from 1.0 to 20.0% by weight, based on the weight of the layer of the crystallizable thermoplastic. The ratio by weight of flame retardant to thermoplastic usually maintained when producing the masterbatch is in the range from 60:40 to 10:90.

Typical flame retardants include bromine compounds, chloroparaffins and other chlorine compounds, antimony trioxide, and alumina trihydrates, but the halogen compounds are disadvantageous due to the halogen-containing by-products produced. Another extreme disadvantage is the low lightfastness of any film provided with these, and also the evolution of hydrogen halides in the event of a fire.

Examples of suitable flame retardants used according to the invention are organophosphorus compounds, such as carboxyphosphinic acids, anhydrides of these, and dimethyl methylphosphonate. It is important for the invention that the organophosphorus compound is soluble in the thermoplastic, since otherwise compliance with the required optical properties is lacking.

Since the flame retardants generally have some degree of susceptibility to hydrolysis, the additional use of a hydrolysis stabilizer can be advisable.

The hydrolysis stabilizers generally used are phenolic stabilizers, alkali metal/alkaline earth metal stearates, and/or alkali metal/alkaline earth metal carbonates, in amounts of from 0.01 to 1.0% by weight. The amount used of phenolic stabilizers is preferably from 0.05 to 0.6% by weight, in particular from 0.15 to 0.3% by weight, and their molar mass is preferably more than 500 g/mol. Pentaerythrityl tetrakis-3-(3,5-di-tert-butyl-4-hydroxyphenyl)propionate or 1,3,5-trimethyl-2,4,6-tris(3,5-di-tert-butyl-4-hydroxybenzyl) benzene is particularly advantageous.

In one particularly preferred embodiment, the film of the invention comprises from 1 to 20% by weight of a flame retardant, such as dimethyl methylphosphonate and from 0.01 to 5.0% by weight of 2-(4,6-diphenyl-1,3,5-triazin-2-yl)-5-hexyloxyphenol of the formula

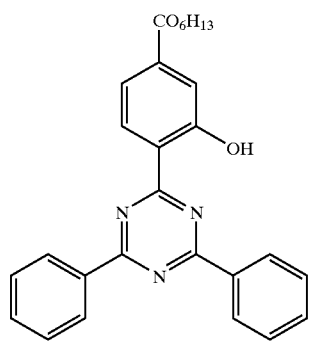

or from 0.01 to 5.0% by weight of 2,2-methylenebis(6-(2H-benzotriazol-2-yl)-4-(1,1,2,2-tetramethylpropyl)-phenol) of the formula

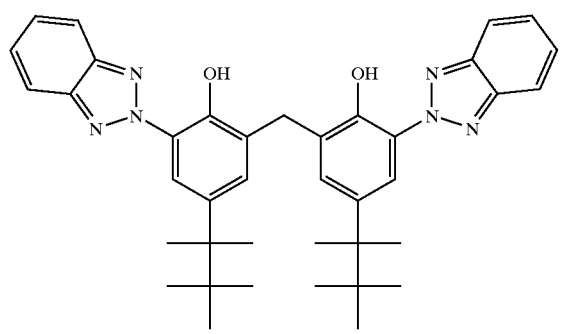

In one preferred embodiment, use may also be made of a mixture of these two UV stabilizers, or of a mixture of at least one of these two UV stabilizers with other UV stabilizers, the total concentration of light stabilizer preferably being from 0.01 to 5.0% by weight, based on the weight of crystallizable polyethylene terephthalate.

Besides the flame retardant fed by way of masterbatch technology and the UV stabilizer, the base layer and/or the outer layer(s) may also comprise conventional additives, such as stabilizers and antiblocking agents. They are advantageously added to the polymer or polymer mixture before melting begins. Examples of stabilizers used are phosphorus compounds, such as phosphoric acid or phosphoric esters. Typical antiblocking agents (also termed pigments in this context) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc, or manganese salts of the dicarboxylic acids used, carbon black, titanium dioxide, kaolin, or crosslinked polymer particles, such as polystyrene particles or acrylate particles.

Additives selected may also be mixtures of two or more different antiblocking agents, or mixtures of antiblocking agents of the same composition, but with different particle sizes. The usual concentration of the particles may be added to each of the layers, e.g. in the form of a glycolic dispersion during polycondensation or by way of masterbatches during extrusion. Pigment concentrations which have proven particularly suitable are from 0.0001 to 10% by weight. Addition of these particles to the outer layer gives another advantageous opportunity of varying the degree of mattness of the film. Increase in pigment concentration is generally associated with an increase in the degree of mattness of the film. An example of a detailed description of antiblocking agents is found in EP A 0 602 964.

The present invention also provides a process for producing this film. It encompasses a) producing a film from base and outer layer(s) by coextrusion,
b) biaxial orientation of the film, and
c) heat-setting of the oriented film.

It is important for the invention that the masterbatch which comprises the flame retardant and, where appropriate, the hydrolysis stabilizer is precrystallized or predried. This predrying includes gradual heating of the masterbatch at subatmospheric pressure (from 20 to 80 mbar, preferably from 30 to 60 mbar, in particular from 40 to 50 mbar), with stirring, and, where appropriate, post-drying at constant increased temperature, again at subatmospheric pressure. The masterbatch is preferably charged at ambient temperature from a feed vessel in the required blend together with the polymers of the base and/or outer layers and, where appropriate, with other raw material components batchwise into a vacuum dryer which during the course of the drying or residence time passes through a temperature profile of from 10 to 160° C., preferably from 20 to 150° C., in particular from 30 to 130° C. During a residence time of about 6 hours, preferably 5 hours, in particular 4 hours, the raw material mixture is stirred at from 10 to 70 rpm, preferably from 15 to 65 rpm, in particular from 20 to 60 rpm. The resultant precrystallized or predried raw material mixture is post-dried in a downstream vessel, likewise evacuated, at from 90 to 180° C., preferably from 100 to 170° C., in particular from 110 to 160° C., for from 2 to 8 hours, preferably from 3 to 7 hours, in particular from 4 to 6 hours.

To produce the outer layer of the invention, it is advantageous to feed pellets of mixture component I and pellets of mixture component II in the desired mixing ratio directly to the extruder, where appropriate together with the flame retardant masterbatch which has been predried. It has proven advantageous for extrusion of the matt outer layer of the invention to use a twin-screw extruder, e.g. as described in EP 0 826 478. The materials can be melted and extruded at about 300° C. with a residence time of about 5 min. Under these conditions, transesterification reactions can proceed in the extruder, and these can form other copolymers from the homopolymers and the copolymers.

The polymers for the base layer are advantageously fed by way of another extruder, together with the flame retardant masterbatch, which has been predried. Any foreign bodies or contamination present may be filtered out from the polymer melt prior to extrusion. The melts are then extruded through a coextrusion die to give flat melt films and laminated to one another. The multilayer film is then drawn off and solidified with the aid of a chill roll and, where appropriate, other rolls.

The biaxial orientation is generally carried out sequentially or simultaneously.

In sequential stretching, it is preferable to orient first longitudinally (i.e. in machine direction) and then transversely (i.e. perpendicularly to machine direction). This leads to orientation of the molecular chains. The longitudinal orientation can be carried out with the aid of two rolls running at different speeds corresponding to the desired stretching ratio. For transverse orientation use is generally in the range made of an appropriate tenter frame. In simultaneous stretching the film is simultaneously stretched longitudinally and transversely in a tenter frame.

The temperature at which the orientation is carried out may vary within a relatively wide range and depends on the desired properties of the film. The longitudinal stretching is generally carried out at from 80 to 130° C. and the transverse stretching at from 90 to 150 C. The longitudinal orientation ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. If desired, the transverse stretching may be followed by another longitudinal orientation, and even by another transverse orientation.

In the heat-setting which follows, the film is held at a temperature of from 150 to 250° C. for from 0.1 to 10 s. The film is then wound up in the usual way.

One or both surfaces of the film may therefore have a coating. The thickness of this coating on the finished film is from 5 to 100 nm, preferably from 20 to 70 nm, in particular from 30 to 50 nm. It is preferably applied in-line, i.e. during the film-production process, advantageously prior to transverse orientation. Application by reverse gravure roll coatings is particularly preferred, and this process permits extremely uniform application of the coating at the layer thickness mentioned. The coatings are applied—preferably by aqueous methods—as solutions, suspensions, or dispersions, and provide the film surface with additional functionality, for example making the film sealable, printable, metallizable, sterilizable, antistatic, or improving its aroma barrier for example, or permitting its adhesion to materials which would not otherwise adhere to the film surface (e.g. photographic emulsions). Examples of substances or compositions which provide additional functionality are:

Acrylates, as described by way of example in WO 94/13476, ethylene-vinyl alcohols, PVDC, waterglass ($Na_2SiO_4$), hydrophilic polyesters (PET/IPA polyesters containing the sodium salt of 5-sulfoisophthalic acid, for example as described in EP-A-0 144 878 or U.S. Pat. No. 4,252,885 or EP-A-0 296 620), vinyl acetates, for example as described in WO 94/13481, polyvinyl acetates, polyurethanes, the alkali metal or alkaline earth metal salts of $C_{10}$–$C_{18}$ fatty acids, and butadiene copolymers with acrylonitrile or methyl methacrylate, methacrylic acid, acrylic acid, or esters thereof.

The compositions or substances mentioned are applied in the form of dilute, preferably aqueous, solution, emulsion, or dispersion to one or both surfaces of the film. The solvent is then evaporated. If the coatings are applied in-line prior to transverse stretching, the heat treatment during transverse stretching and subsequent heat-setting is usually sufficient to evaporate the solvent and dry the coating. The dried coatings then have the abovementioned desired layer thicknesses.

The films may also be coated—preferably in an off-line process—with metals, such as aluminum, or with ceramic materials, such as $SiO_x$ or $Al_xO_y$. This in particular improves their gas-barrier properties.

The polyester film of the invention preferably also comprises a second outer layer C. The structure, thickness, and composition of the second outer layer may be selected irrespective of the other outer layer present, and the second outer layer may likewise comprise the abovementioned polymers, the UV stabilizer, the flame retardant, or polymer mixtures for the base layer or the first outer layer of the invention, but these do not have to be identical with those of the first outer layer. The second outer layer may also comprise other commonly used outer layer polymers, while these may also be provided with UV stabilizer and/or the flame retardant.

If desired, there may also be an intermediate layer between the base layer and the outer layer(s). The intermediate layer may be composed of the polymers described for the base layer. In one particularly preferred embodiment, it is composed of the polyester used for the base layer. It may also comprise the conventional additives described, and the flame retardant and/or the UV stabilizer. The thickness of the intermediate layer is generally above 0.3 $\mu$m, preferably in the range from 0.5 to 15 $\mu$m, in particular from 1.0 to 10 $\mu$m.

The thickness of the outer layer(s) is generally above 0.1 $\mu$m, preferably in the range from 0.2 to 5 $\mu$m, in particular from 0.2 to 4 $\mu$m, and the thicknesses of the outer layers may be identical or different.

The total thickness of the polyester film of the invention may vary within wide limits and depends on the intended application. It is preferably from 4 to 500 $\mu$m, in particular from 5 to 450 $\mu$m, with preference from 6 to 300 $\mu$m, the base layer preferably making up from about 40 to 90% of the total thickness.

It is entirely surprising that the use of the abovementioned UV stabilizers in films led to the desired result. The skilled worker would probably first have attempted to achieve UV resistance by using an antioxidant, but would have discovered that on weathering the film rapidly yellows.

On using conventional UV stabilizers, the skilled worker would have found that
- the UV stabilizer has inadequate thermal stability and at temperatures of from 200 to 240° C. decomposes and evolves gases
- large amounts of UV stabilizer would have had to have been incorporated (from about 10 to 15% by weight) to absorb the UV light and prevent damage to the film.

At these high concentrations, the skilled worker would have found that the film becomes yellow just after it has been produced, with Yellowness Index deviations (YI) around 25. The mechanical properties of the film would also have been found to be adversely affected. Orientation would have produced exceptional problems, such as
- break-offs due to unsatisfactory strength, i.e. modulus of elasticity too low;
- die deposits, causing profile variations;
- roller deposits from the UV stabilizer, causing immpairment of optical properties (poor haze, defective adhesion, non-uniform surface);
- deposits in stretching frames or heat-setting frames, dropping onto the film.

It was therefore more than surprising that even low concentrations of the UV stabilizer of the invention achieve excellent UV protection. It was very surprising that, together with this excellent UV protection:
- within the accuracy of measurement, the Yellowness Index of the film is unchanged from that of an unstabilized film;
- there were no evolution of gases, no die deposits, and no frame condensation, and the film therefore has excellent optical properties and excellent profile and layflat;
- the UV-resistant film has excellent stretchability, and can therefore be produced in a reliable and stable manner on high-speed film lines at speeds of up to 420 m/min.

It was also surprising that a flame-retardant film with the required property profile can be produced cost-effectively and without caking in the dryer by using masterbatch technology and suitable predrying and/or precrystallization and, where appropriate, small amounts of a hydrolysis stabilizer, and that the film does not embrittle by exposure to heat and does not break when folded.

It is moreover very surprising that it is also possible to reuse the recycled material (regrind) produced from the films without adversely affecting the Yellowness Index of the film.

The film of the invention can readily be recycled without pollution of the environment, and is therefore suitable for use as short-lived advertising placards, in the construction of exhibition stands, or for other short-lived promotional items, where fire protection and UV absorption are desired.

Another advantage is that the production costs of the film of the invention are only slightly higher than those for a film made from standard polyesters. The other properties of the film of the invention relevant to its processing and use are substantially unchanged or indeed have been improved. In addition, it has been ensured that during production of the film it is possible to reuse the regrind in a proportion of up to 50% by weight, preferably from 10 to 50% by weight, based in each case on the total weight of the film, without any significant resultant adverse effect on the physical properties of the film.

In summary, the film of the invention has flame retardancy to DIN 4102 (construction materials classes B1 and B2), is impermeable to UV light, is highly UV resistant, has low gloss, in particular low gloss on film surface A, and has comparatively low haze. It moreover has good winding and processing performance. It is also worthy of mention that the outer layer of the invention has good writability with respect to ballpoint pen, felt-tip pen, or fountain pen.

The gloss of film surface A is lower than 70. In one preferred embodiment the gloss of this side is less than 60, and in one particularly preferred embodiment less than 50. This surface of the film is therefore particularly effective for promotional purposes.

In addition, the film complies with construction materials classes B1 and B2 to DIN 4102 Part 1 and Part 2 and shows no embrittlement on exposure to heat. The Yellowness Index (YI) of the film of the invention is not higher than that of a standard film. The film begins to transmit light or radiation at >360 nm, i.e. the film absorbs the harmful UV radiation. A non-UV-resistant film transmits radiation from as low as 280 nm, i.e. the UV light in the wavelength region from 280 to 360 nm is not absorbed but transmitted by the film.

The haze of the film of the invention is smaller than 40%. In one preferred embodiment, the haze of the film is less than 35%, and in one particularly preferred embodiment less than 30%. The comparatively low haze of the film (compared with a matt monofilm, see comparative example) means that the film can, for example, be reverse-printed, or viewing windows can be incorporated through which, for example, the contents can be clearly discerned.

The combination of exceptional properties gives the film of the invention excellent suitability for a wide variety of applications, for example for interior decoration, for construction of exhibition stands or for exhibition requisites, as displays, for placards, for protective glazing of machinery or vehicles, in the lighting sector, in the fitting out of shops or of stores, as a promotional item, or laminating medium, for greenhouses, roofing systems, exterior cladding, protective coverings, applications in the construction sector, and illuminated advertising profiles, blinds, and electrical applications.

Other application sectors are its use for producing labels, as a release film, or as a hot-stamping foil, or in-mold labeling.

The table below (Table 1) gives again the most important film properties of the invention.

TABLE 1

|  | inventive range | preferred | particularly preferred | Unit | Test method |
|---|---|---|---|---|---|
| Gloss, side A (measurement angle 60) | <70 | <60 | <50 |  | DIN 67 530 |
| Haze | <40 | <35 | <30 | % | ASTM D |
| Coefficient of friction: |  |  |  |  | DIN 53 375 |
| Side A with respect to itself | <0.6 | <0.55 | <0.50 |  |  |
| Side B and, respectively, C with respect to itself | <0.5 | <0.55 | <0.55 |  |  |
| Average roughness $R_a$ (side A) | 200–600 | 230–550 | 250–530 | nm | DIN 4768 with cutoff at 0.25 nm |
| Yellowness Index (YI) | <30 | <20 | <10 |  | DIN 6167 |
| High UV resistance |  |  |  |  |  |
| Permeability to UV light from wavelength | >350 | >360 | >370 | nm |  |
| Construction materials class to DIN 4102 Part 2 and Part 1 | complies with B 2 complies with B 1 |  |  |  |  |

The methods used to characterize the polymers and the films were as follows:

Test Methods

DIN=Deutsches Institut für Normung
ISO=International Organization for Standardization
ASTM=American Society for Testing and Materials

SV (DCA), IV (DVE)

Standard viscosity SV (DCA) is measured in dichloroacetic acid by a method 30 based on DIN 53726.

Intrinsic viscosity (IV) is calculated as follows from standard viscosity $$IV(DCA)=6.67 \cdot 10^{-4} SV(DCA)+0.118$$

Coefficient of Friction

Coefficient of friction is determined to DIN 53 375, 14 days after production.

Surface Tension

Surface tension was determined by what is known as the ink method (DIN 53 364).

Haze

Haze of the film was measured to ASTM D1003-52. The Hölz haze measurement was made by a method based on ASTM D1003-52, but in order to utilize the ideal measurement range was measured on four mutually superimposed laps of film, and a 1° slit diaphragm was used instead of a 4° pinhole.

Gloss

Gloss was determined to DIN 67 530. Reflectance was measured, this being an optical value characteristic of a film surface. Based on the standard ASTM D523-78 and ISO 2813, the angle of incidence was set at 20 or 60. A beam of light hits the flat test surface at the set angle of incidence and is reflected and/or scattered by the surface. A proportional electrical variable is displayed representing light rays hitting the photoelectric detector. The value measured is dimensionless and must be stated together with the angle of incidence.

Roughness

The roughness $R_a$ of the film was determined to DIN 4768 with a cutoff of 0.25 mm.

Mechanical Properties

Modulus of elasticity and tensile strength at break, and tensile strain at break, were measured longitudinally and transversely to ISO 527-1-2.

Weathering (Bilateral), UV Resistance

UV resistance was tested as follows to the ISO 4892 test specification:

| Test equipment | Atlas Ci65 Weather-Ometer |
|---|---|
| Test conditions | to ISO 4892, i.e. artificial weathering |
| Irradiation time | 1 000 hours (per side) |
| Irradiation | 0.5 W/m², 340 nm |
| Temperature | 63° C. |
| Relative Humidity | 50% |
| Xenon lamp | internal and external filter made from borosilicate |
| Irradiation cycles | 102 minutes of UV light, then 18 minutes of UV light with water spray on the specimens, then again 102 minutes of UV light, etc. |

Numerical values of <0.3 can be disregarded and mean that no significant color change has occurred.

Yellowness Index

Yellowness Index (YI) is the deviation from colorlessness in the "yellow" direction and is measured to DIN 6167. Yellowness Indices (YIs)<5 are not visually detectable.

Each of the examples and comparative examples below concerns transparent films of varying thickness, produced on the extrusion line described.

All of the films were weathered bilaterally, each for 1000 hours per side, to the test specification ISO 4892 using the Atlas C165 Weather-Ometer, and then tested for mechanical properties, Yellowness Index (YI), surface defects, light transmittance, and gloss.

The examples below provide illustration of the invention.

EXAMPLE 1 a) Preparation of Component II for the Outer Layer Mixture of the Invention

A copolyester having about 90 mol % of isophthalic acid and 10 mol % of the sodium salt of 5-sulfoisophthalic acid as acid component and 100 mol % of ethylene glycol as glycol component was prepared by the following process:

A stainless steel reaction vessel of 2 i capacity, equipped with an anchor stirrer, a thermal element for measuring the temperature of the vessel contents, an 18 inch Claisen/Vigreux distillation column with condenser and receiver, an inlet opening, and a heating jacket, was preheated to 190° C. and flushed with nitrogen. 1065.6 g of dimethyl isophthalate, 180.6 g of the sodium salt of dimethyl 5-sulfoisophthalate, and 756.9 g of ethylene glycol were placed in the vessel. A buffer ($Na_2CO_3$ $10H_2O$-0.439 g) and a transesterification catalyst ($Mn(OAc)_2$ $4H_2O$-0.563 g) were also placed in a vessel. The mixture was heated with stirring, whereupon methanol distilled off. During the distillation the temperature in the vessel was gradually increased to 250° C. When the distillate weight corresponded to the theoretical methanol yield, an ethylene glycol solution comprising 0.188 g of phosphorous acid was added. The distillation column was replaced by a curved vapor take-off with receiver. 20 g of pure ethylene carbonate were added to the reaction mixture, whereupon vigorous evolution of gas ($CO_2$) began immediately. $CO_2$ evolution subsided after about 10 min. A reduced pressure of 240 mmHg was then applied, and the polycondensation catalyst (0.563 g of $Sb_2O_3$ slurried in ethylene glycol) was added. The reaction mixture was stirred for 10 min while the reduced pressure of 240 mmHg was maintained, and then the pressure was further reduced to from 240 to 20 mmHg in steps of 10 mmHg/min. As soon as the pressure in the system had been reduced to 20 mmHg, the temperature in the vessel was raised from 250 to 290° C. at a rate of 2 C/min. When the temperature in the vessel had reached 290° C. the stirrer speed was throttled back and the pressure was reduced to not more than 0.1 mmHg. At this juncture a read-out was obtained from the stirrer motor using an ammeter. The viscosity of the polymer was controlled by allowing the polycondensation to proceed in accordance with set values for the change in the ampere value from the stirrer motor of (in each case) 2.3 A. When the desired molecular weight had been achieved, nitrogen pressure was applied to the vessel to expel the liquid polymer from the outlet in the base of the vessel into an ice-water quenching bath.

B) Preparation of the Mixture for Outer Layer A of the Invention

75% by weight of component I (polyethylene terephthalate with SV of 680) were fed to the inlet hopper of a twin-screw extruder with 15% by weight of component II and 10% by weight of a masterbatch which comprises the UV stabilizer, and the two components were extruded together at about 300° C. and fed to the outer layer channel A of a coextrusion die.

The masterbatch is composed of 5% by weight of 2-(4,6-diphenyl-1,3,5-triazin-2-yl)-5-hexyloxyphenol (®TINUVIN 1577) as UV stabilizer and 95% by weight of polyester.

Base Layer B:

The predried flame retardant is metered in the form of a masterbatch into the base layer.

The flame retardant masterbatch is composed of 20% by weight of flame retardant and 80% by weight of polyester.

The flame retardant is the organophosphorus compound dimethyl methylphosphonate ®Amgard P1045 from the company Albright & Wilson, which is soluble in the polyester.

The composition of the base layer is as follows:

| | |
|---|---|
| 75% by weight | of polyethylene terephthalate (RT 49 from Hoechst AG) with SV of 800 and |
| 5% by weight | of masterbatch made from 99% by weight of polyethylene terephthalate and 1.0% by weight of silica particles (® Sylobloc 44 H from the company Grace) with average particle size of 4.5 μm |
| 20% by weight | of the flame retardant masterbatch. |

The components of the base layer are charged at room temperature from separate feed vessels into a vacuum dryer which prior to the juncture of charging until the end of the residence time traverses a temperature profile of from 25 to 130° C. The raw material mixture is stirred at 61 rpm during the residence time of 4 hours.

The precrystallized or predried raw material mixture is post-dried in the downstream hopper, likewise in vacuo, at 140° C. for 4 hours, and fed to the extruder for the base layer.

Outer Layers A and C:

Chips made from polyethylene terephthalate and from a filler were likewise fed to the extruder for the outer layer C. A transparent three-layer film with ABC structure and total thickness 12 μm was then produced by coextrusion followed by stepwise longitudinal and transverse orientation. The thickness of each of the outer layers was 1.5 μm.

| | |
|---|---|
| Outer layer A: | |
| 75% by weight | of component I |
| 15% by weight | of component II, and |
| 10% by weight | of UV masterbatch (5% by weight of ® TINUVIN 1577, 95% by weight of polyester) |
| Outer layer C | |
| 80% by weight | of polyethylene terephthalate (RT 49 from Hoechst AG) with SV of 800 and |
| 10% by weight | of masterbatch made from 99% by weight of polyethylene terephthalate and 1.0% by weight of silica particles (® Sylobloc 44 H from the company Grace) with an average particle size of 4.5 μm, and |
| 10% by weight | of UV masterbatch (5% by weight of ® TINUVIN 1577, 95% by weight of polyester) |

The individual steps of the process were:

| | | |
|---|---|---|
| Longitudinal stretching | Temperature: | 85–135° C. |
| | Longitudinal stretching ratio: | 4.0:1 |
| Transverse stretching | Temperature: | 85–135° C. |
| | Transverse stretching ratio: | 4.0:1 |
| Setting | Temperature: | 230° C. |

EXAMPLE 2

In a manner similar to that of Example 1, a three-layer film with a total thickness of 12 μm was produced by coextrusion. Only the composition of outer layer A was changed:

Outer Layer A:

70% by weight of component I
20% by weight of component II, and
10% by weight of UV masterbatch.

EXAMPLE 3

A coextruded film using the mixing specification of Example 1, in which the composition of outer layer A was as follows:

65% by weight of component I
25% by weight of component II, and 10% by weight of UV masterbatch.

EXAMPLE 4

A coextruded film using the mixing specification of Example 1, in which the composition of outer layer A was as follows:

55% by weight of component I
35% by weight of component II, and
10% by weight of UV masterbatch.

COMPARATIVE EXAMPLE

A monofilm was produced and had the composition of outer layer A from Example 3. The film surfaces had the required mattness, but the film did not meet the set requirements because it had excessive haze. It was also very difficult to produce the film by a process which was reliable and therefore cost-effective.

The film is moreover not UV-resistant and transmits the harmful UV light. After 1000 hours of weathering the film exhibits cracks and embrittlement phenomena, and also visible yellowing. The film is not compliant with construction material classes B1 and B2.

TABLE 2

| Ex. No. | Compliant with construction material classes to DIN 4102 | Film thickness (μm) | Outer layer thickness A/C(μm) | Film structure | Gloss (60° measurement angle) Side A | Gloss (60° measurement angle) Side C | Haze | Permeability to radiation (nm) |
|---|---|---|---|---|---|---|---|---|
| 1 | B1 and B2 | 12 | 1.5/1.5 | ABC | 65 | 175 | 25 | >360 |
| 2 | B1 and B2 | 12 | 1.5/1.5 | ABC | 55 | 175 | 26 | >360 |
| 3 | B1 and B2 | 12 | 1.5/1.5 | ABC | 45 | 175 | 28 | >360 |
| 4 | B1 and B2 | 12 | 1.5/1.5 | ABC | 35 | 175 | 30 | >360 |
| CE |  | 12 |  | A | 35 | 160 | 70 | >280 |

After 1000 hours of weathering using the Atlas CI65 Weather-Ometer the films of Examples 1–4 do not show any kind of embrittlement or cracking, and their Yellowness Indices are <10.

What is claimed is:

1. A coextruded, biaxially oriented polyester film composed of a base layer and of at least one outer layer, where the film comprises, as flame retardant, at least one organic phosphorous compound soluble in thermoplastics, and further comprises at least one UV stabilizer and wherein the film has a mat outer layer which comprises a mixture or a blend or a mixture and a blend made from two components I and II, where component I is essentially a polyethylene terephthalate homopolymer or polyethylene terephthalate copolymer or a mixture made from polyethylene terephthalate homopolymer or from polyethylene terephthalate copolymers, and component II is a polymer which is a condensation product of the following monomers or of their derivatives capable of forming polymers or of the following monomers and of their derivatives capable of forming polymers:

A) from about 65 to about 95 mol % of isophthalic acid;
B) from 0 to about 30 mol % of at least one aliphatic dicarboxylic acid with the formula HOOC(CH$_2$)$_n$COOH where
n is from 1 to 11;
C) from about 5 to about 15 mol % of at least one sulfomonomer containing an alkali metal sulfonate group on the aromatic moiety of an aromatic dicarboxylic acid;
D) a copolymerizable aliphatic or cycloaliphatic glycol having from 2 to 11 carbon atoms, in the stoichiometric amount necessary to form about 100 mol % of condensate; where each of the percentages given is based on the total amount of the monomers forming component II.

2. The film as claimed in claim 1, wherein the ratio of components I and II is in the range from I:II=about 10: about 90 to I:II=about 95: about 5.

3. The film as claimed in claim 1, wherein the UV stabilizer is selected from the group consisting of 2-hydroxybenzotriazoles, triazines and mixtures of these.

4. The film as claimed in claim 1, wherein the concentration of the flame retardant is from about 0.5 to about 30.0% by weight, based on the weight of the crystallizable thermoplastic.

5. The film as claimed in claim 4, wherein the concentration of the flame retardant is from about 1.0 to about 20.0% by weight, based on the weight of the crystallizable thermoplastic.

6. The film as claimed in claim 1, wherein the flame retardant comprises organophosphorus compounds.

7. The flint as claimed in claim 6, wherein the flame retardant comprises carboxyphosphinic acids, or anhydrides of these.

8. The film as claimed in claim 1, wherein additionally a hydrolysis stabilizer is present in the form of a phenolic stabilizer or one or more of alkali metal stearate, alkaline earth metal stearate, alkali metal carbonate and alkaline earth metal carbonate in amounts of from about 0.01 to about 1.0% by weight.

9. The film as claimed in claim 8, wherein the hydrolysis stabilizer is a phenolic stabilizer in amounts of from about 0.05 to about 0.6% by weight.

10. The film as claimed in claim 9, wherein, the amount is from about 0.15 to about 0.3% by weight, and the hydrolysis stabilizer has a molar mass above about 500 g/mol.

11. The film as claimed in claim 8, wherein the hydrolysis stabilizer is pentaerythrityltetrakis-3-(3,5-di-tert-butyl-4- hydroxyphenyl)propionate or 1,3,5-trimethyl-2,4,6-tris(3,5-di-tert-butyl-4-hydroxybenzyl)-benzene or pentaerythrityl tetrakis-3-(3,5-di-tert-butyl-4-hydroxybenzyl)-benzene.

12. The film as claimed in claim 1, wherein the outer layer has a thickness of from about 0.2 to about 6 μm.

13. The film as claimed in claim 1, wherein the film has two layers and is composed of the base layer and of the outer layer.

14. The film as claimed in claim 1, wherein the film has three layers and is composed of the base layer and of an outer layer on each side of the base layer.

15. The film as claimed in claim 13 or 14, wherein an outer layer comprises an inorganic filler.

16. The film as claimed in claim 1, wherein at least one surface of the film is metallized or is coated with $SiO_x$, $Al_xO_y$, ethylvinyl alcohol, PVDC, waterglass, hydrophilic polyester, vinyl acetate, polyvinyl acetate, polyurethane, fatty acid salts of alkali metals or of alkaline earth metals, butadiene copolymer, (meth)acrylic acid or esters thereof, or silicone.

17. A process for producing a film as claimed in claim 1, in which polyester melts corresponding to the compositions of the outer and base layers are fed to a coextrusion die, and extruded from the die onto a chill roll, and the resultant prefilm is then biaxially oriented and heat-set, where the polyester melts for one or more of the base layer and the outer layer comprise at least one or more of UV stabilizer and flame retardant, and the polyester melt for the outer layer comprises a mixture or a blend or a mixture and a blend made from two components I and II, where component I is a polyethylene terephthalate homopolymer or polyethylene terephthalate copolymer or a mixture made from polyethylene terephthalate homo- or copolymers and component II is a polymer which contains at least one sulfonate group.

18. A method of making an interior decoration, a display, a placards, a protective glazing, a shop outfit, a promotional requisite, a laminating medium, an exterior cladding, a protective covering, an illuminated advertising profile, or a blind, which comprises convening a film as claimed in claim 1 into an interior decoration, a display, a placards, a protective glazing, a shop outfit, a promotional requisite, a laminating medium, an exterior cladding, a protective covering, an illuminated advertising profile, or a blind.

19. A method of making a label which comprises converting a film as claimed in claim 1 into a label.

20. A method of making a release film for producing glass-fiber-reinforced semifinished products which comprises converting a film as claimed in claim 1 into a release film.

21. A method of making a hot-stamping foil which comprises converting a film as claimed in claim 1 into a hot-stamping foil.

22. A method of making an in-mold label which comprises converting a film as claimed in claim 1 into an in-mold label.

23. A coextruded, biaxially oriented polyester film composed of a base layer and of at least one outer layer, where the film comprises, as flame retardant, at least one organic phosphorous compound soluble in thermoplastics, and further comprises at least one UV stabilizer and wherein the film has a mart outer layer which comprises a mixture or a blend or a mixture and a blend made from two components I and II, where component I is essentially a polyethylene terephthalate homopolymer or polyethylene terephthalate copolymer or a mixture made from polyethylene terephthalate homopolymer or from polyethylene terephthalate copolymers, and component II is a polymer which is a condensation product of the following monomers or of their derivatives capable of forming polymers or of the following monomers and of their derivatives capable of forming polymers:

A) from about 65 to about 95 mol % of isophthalic acid;
B) from 0 to about 30 mol % of at least one aliphatie dicarboxylic acid with the formula

where
n is from 1 to 11;
C) from about 5 to about 15 mol % of at least one sulfomonomer containing an alkali metal sulfonate group on the aromatic moiety of an aromatic dicarboxylic acid;
D) a copolymerizable aliphatic or cycloaliphatic glycol having from 2 to 11 carbon atoms, in the stoichiometric amount necessary to form about 100 mol % of condensate; where each of the percentages given is based on the total amount of the monomers forming component II,
wherein said flame retardant is supplied within a predried or precrystallized masterbatch composition, said polyester film thus further comprising predried or precrystallized carrier polymer.

24. A coextruded, biaxially oriented polyester film comprising a base layer disposed between first and second outer layers,
said base layer comprising at least one organic phosphorous flame retardant soluble in thermoplastics,
said first outer layer comprising at least one UV stabilizer and a mixture or a blend or a mixture and a blend made from two components I and II, where component I is essentially a polyethylene terephthalate homopolymer or polyethylene terephthalate copolymer or a mixture made from polyethylene terephthalate homopolymer or from polyethylene terephthalate copolymers, and component II is a polymer which is a condensation product of the following monomers or of their derivatives capable of forming polymers or of the following monomers and of their derivatives capable of forming polymers:

A) from about 65 to about 95 mol % of isophthalic acid;
B) from 0 to about 30 mol % of at least one aliphatic dicarboxylic acid with the formula

where
n is from 1 to 11;
C) from about 5 to about 15 mol % of at least one sulfomonomer containing an alkali metal sulfonate group on the aromatic moiety of an aromatic dicarboxylic acid;
D) a copolymerizable aliphatic or cycloaliphatic glycol having from 2 to 11 carbon atoms, in the stoichiometric amount necessary to form about 100 mol % of condensate; where each of the percentages given is based on the total amount of the monomers forming component II,
said second outer layer comprising at least one CV stabilizer,
wherein said UV stabilizer is absent from said base layer and said flame retardant is absent from said first and second outer layers.

25. A polyester film according to claim 24, wherein said at least one UV stabilizer is a mixture of 2-(4,6-diphenyl-1,3,5-triazin-2-yl)5-hexyloxyphenol and 2,2-methylenebis (6-(2H-benzotriazol-2-yl)-4-(1,1,2,2-tetramethylpropyl)-phenol.

* * * * *